US009398481B2

(12) United States Patent
Chai et al.

(10) Patent No.: US 9,398,481 B2
(45) Date of Patent: Jul. 19, 2016

(54) MEASUREMENT METHOD, CSI-RS RESOURCE SHARING METHOD AND APPARATUS

(71) Applicant: Huawei Technologies Co., Ltd., Shenzhen, Guangdong (CN)

(72) Inventors: Li Chai, Beijing (CN); Bo Lin, Beijing (CN); Jingyuan Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 14/335,008

(22) Filed: Jul. 18, 2014

(65) Prior Publication Data
US 2014/0362793 A1    Dec. 11, 2014

Related U.S. Application Data

(63) Continuation of application No. PCT/CN2013/070695, filed on Jan. 18, 2013.

(30) Foreign Application Priority Data

Jan. 18, 2012 (CN) .......................... 2012 1 0016126

(51) Int. Cl.
*H04W 24/10* (2009.01)
*H04W 24/00* (2009.01)
(Continued)

(52) U.S. Cl.
CPC ............. *H04W 24/10* (2013.01); *H04B 17/318* (2015.01); *H04L 5/0053* (2013.01);
(Continued)

(58) Field of Classification Search
CPC ..... H04W 24/10; H04B 17/318; H04B 7/024; H04L 5/0053; H04L 5/0094; H04L 5/0026; H04L 5/0035; H04L 5/005
See application file for complete search history.

(56) References Cited

U.S. PATENT DOCUMENTS

2012/0094681 A1*  4/2012  Freda ................. H04W 72/02
                                                            455/452.1
2012/0287875 A1* 11/2012  Kim .................... H04L 5/0048
                                                                370/329

(Continued)

FOREIGN PATENT DOCUMENTS

CN    101541085 A    9/2009
CN    101854235 A    10/2010
(Continued)

OTHER PUBLICATIONS

Machine Translation of WO/2011/078582.*
(Continued)

*Primary Examiner* — Paul H Masur

(57) ABSTRACT

Embodiments of the present invention disclose a measurement method based on channel state information-reference signal CSI-RS resources, a base station, a user equipment UE, and a method for inter-cell CSI-RS resource sharing. The measurement method includes: sending, by a first base station, information of at least one CSI-RS configuration set to a user equipment UE; receiving, by the first base station, a result of measurement performed by the UE on a subset or a full set of measurement resources corresponding to the CSI-RS configuration set, wherein the CSI-RS configuration set includes at least two CSI-RS configurations. The technical solution for measurement provided in the embodiments of the present invention implements CSI-RS measurement over multiple CSI-RS configurations, thereby overcoming the problem that REs of a CSI-RS are sparse, and improving the measurement precision of a UE.

18 Claims, 5 Drawing Sheets

(51) Int. Cl.
*H04B 17/318* (2015.01)
*H04L 5/00* (2006.01)
*H04B 7/02* (2006.01)

(52) U.S. Cl.
CPC ............ *H04L 5/0094* (2013.01); *H04W 24/00* (2013.01); *H04B 7/024* (2013.01); *H04L 5/005* (2013.01); *H04L 5/0026* (2013.01); *H04L 5/0035* (2013.01)

(56) References Cited

U.S. PATENT DOCUMENTS

| | | | | |
|---|---|---|---|---|
| 2013/0003788 | A1* | 1/2013 | Marinier | H04B 7/024 375/219 |
| 2013/0039199 | A1* | 2/2013 | Liao | H04B 7/0626 370/252 |
| 2013/0148533 | A1 | 6/2013 | Li et al. | |
| 2013/0208604 | A1* | 8/2013 | Lee | H04L 25/0226 370/252 |
| 2013/0279361 | A1* | 10/2013 | Seo | H04J 11/0053 370/252 |
| 2014/0308905 | A1* | 10/2014 | Miao | H04L 5/0023 455/67.11 |

FOREIGN PATENT DOCUMENTS

| | | | |
|---|---|---|---|
| CN | 101867457 A | 10/2010 | |
| EP | 2 573 953 A2 | 3/2013 | |
| WO | WO 2011078582 A2 * | 6/2011 | ............ H04L 1/0026 |
| WO | WO 2011/145886 A2 | 11/2011 | |

OTHER PUBLICATIONS

Machine Translation of WO/2011/145886.*
"3rd Generation Partnership Project; Technical Specification Group Radio Access Network; Evolved Universal Terrestrial Radio Access Network (E-UTRAN); X2 application protocol (X2AP)(Release 10)", 3GPP TS 36.423 v10.4.0, Dec. 2011, 132 pages.
"3rd Generation Partnership Project; Technical Specification Group Radio Access Network; Evolved Universal Terrestrial Radio Access Network (E-UTRAN); Radio Resource Control (RRC); Protocol specification (Release 10)", 3GPP TS 36.331 v10.4.0, Dec. 2011, 296 pages.
"CSI-RS configurations for CoMP", ZTE, 3GPP TSG RAN WG1 Meeting #67, Nov. 14-18, 2011, 3 pages.
"CSI Feedback Mechanism for Multiple Transmission Points", Samsung, 3GPP TSG RAN WG1 #67, Nov. 14-18, 2011, 5 pages.
"RE muting design and considerations", LG Electronics, TSG-RAN WG1 Meeting #62, Aug. 23-27, 2010, 6 pages.

* cited by examiner

MEASUREMENT METHOD, CSI-RS RESOURCE SHARING METHOD AND APPARATUS

CROSS-REFERENCE TO RELATED APPLICATION

This application is a continuation of International Application No. PCT/CN2013/070695, filed on Jan. 18, 2013, which claims priority to Chinese Patent Application No. 201210016126.9, filed on Jan. 18, 2012, both of which are hereby incorporated by reference in their entireties.

TECHNICAL FIELD

The present invention relates to the field of communications technologies, and in particular, to a measurement method based on channel state information-reference signal (Channel State Information-reference signal, CSI-RS) resources, a base station, a user equipment UE, and a method for inter-cell CSI-RS resource sharing.

BACKGROUND

In a wireless communications system, coordinated multi-point transmission (Coordinated Multi-Point transmission, CoMP) is an important means of improving overall performance of a cell and performance of users at cell edges. In a CoMP system, network nodes include an evolved base station (evolved NodeB, eNB) and at least one access point (Access Point, AP). Multiple APs can coordinate to transmit and receive data of a user equipment (User Equipment, UE). The coordinating APs may be within coverage of a same base station or different base stations. For example, these APs may be different types of network nodes, including but not limited to a radio signal transceiver (Remote Radio Head, RRH), a remote radio unit (Remote Radio Unit, RRU), a relay, and a base station.

In a Long Term Evolution (Long Term Evolution, LTE) system, a physical layer demodulates corresponding time-frequency resources on a physical layer shared data channel such as a physical downlink control channel (Physical Downlink Control Channel, PDSCH) to obtain data. Because the time-frequency resources of the PDSCH channel are shared by all user equipments in a cell, when a user equipment obtains data, the network side needs to transmit, to the user equipment over a downlink control channel, information of resource blocks that transmit data for the user equipment and relevant physical layer parameters that enable the user equipment to demodulate its corresponding data correctly.

When a user is handed over between cells, the network side delivers measurement control information (Measurement Control) to the user to regulate measurement behaviors of the user and a measurement reporting criterion. The user measures neighboring cells of the access cell, and reports measurement results conforming to the reporting criterion to a network node in the form of a measurement report (Measurement Report), where the measurement report includes a cell identity conforming to the reporting criterion. The network node makes a handover decision for the user according to the measurement results reported by the user.

In measurement, the UE can use a CSI-RS to distinguish between cells covered by APs that have the same physical cell identity (Physical Cell Identity, PCI), and, through CSI-RS measurement on resources of the cells, assess signal levels and signal quality of signals received by the UE from the cells, which is also known as radio resource management (Radio Resource Management, RRM) measurement. According to the measurement result, those with optimal signal quality in an RRM measurement set are selected as a CoMP measurement set, or selected for handover. However, resource elements (Resource Element, RE) of the CSI-RS are too sparse to ensure a satisfactory measurement precision.

SUMMARY

Embodiments of the present invention provide a measurement method based on CSI-RS resources and a base station to overcome the problem that REs of a CSI-RS are too sparse to ensure a satisfactory measurement precision.

In one aspect, an embodiment of the present invention provides a measurement method based on channel state information-reference signal CSI-RS resources, including: sending, by a first base station, information of at least one CSI-RS configuration set to a user equipment UE; and receiving, by the first base station, a result of measurement performed by the UE on a subset or a full set of measurement resources corresponding to the CSI-RS configuration set, where the CSI-RS configuration set includes at least two CSI-RS configurations.

In another aspect, an embodiment of the present invention provides a measurement method based on channel state information-reference signal CSI-RS resources, including: receiving information of at least one CSI-RS configuration set; performing measurement on a subset or a full set of measurement resources corresponding to the at least one CSI-RS configuration set; and sending a result of the measurement to a first base station, where the CSI-RS configuration set includes at least two CSI-RS configurations.

In another aspect, an embodiment of the present invention provides a method for inter-cell channel state information-reference signal CSI-RS resource sharing, including: sending, by a base station, a CSI-RS resource configuration request message to another base station to instruct the another base station to return CSI-RS resource configuration information of cells under access points within coverage of the another base station; and receiving, by the base station, the CSI-RS resource configuration information from the another base station, where the CSI-RS resource configuration information includes information of a CSI-RS configuration set, where the CSI-RS configuration set includes at least two CSI-RS configurations.

In another aspect, an embodiment of the present invention provides a base station, including: a sending unit, configured to send information of at least one CSI-RS configuration set to a user equipment UE; and a receiving unit, configured to receive a result of measurement performed by the UE on a subset or a full set of measurement resources corresponding to the CSI-RS configuration set, where the CSI-RS configuration set includes at least two CSI-RS configurations.

In another aspect, an embodiment of the present invention provides a user equipment UE, including: a receiving unit, configured to receive information of at least one CSI-RS configuration set; a measuring unit, configured to perform measurement on a subset or a full set of measurement resources corresponding to the at least one CSI-RS configuration set; and a sending unit, configured to send a result of the measurement to a first base station, where the CSI-RS configuration set includes at least two CSI-RS configurations.

In another aspect, an embodiment of the present invention provides a base station, including: a sending unit, configured to send a CSI-RS resource configuration request message to another base station to instruct the another base station to return CSI-RS resource configuration information of cells under access points within coverage of the another base station; and a receiving unit, configured to receive the CSI-RS resource configuration information from the another base station, where the CSI-RS resource configuration information includes information of a CSI-RS configuration set, where the CSI-RS configuration set includes at least two CSI-RS configurations.

The technical solution for measurement provided in the embodiments of the present invention implements CSI-RS measurement over multiple CSI-RS configurations, thereby overcoming the problem that REs of a CSI-RS are sparse, and improving the measurement precision of a UE. In addition, the method for inter-cell CSI-RS resource sharing provided in the embodiments of the present invention implements CSI-RS resource sharing between multiple cells.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A person skilled in the art knows that signal level and signal quality of signals received by a UE from a cell are assessed by CSI-RS measurement on resources of the cell. However, REs of a CSI-RS are sparse, which means that few resources are available for measurement in a specific time. Therefore, the embodiments of the present invention provide a solution, where multiple CSI-RS configurations are allocated to one cell, and measurement is performed on measurement resources corresponding to the CSI-RS configurations, thereby overcoming the defect that the REs of a single CSI-RS are sparse, and improving the measurement precision.

Figure 1:
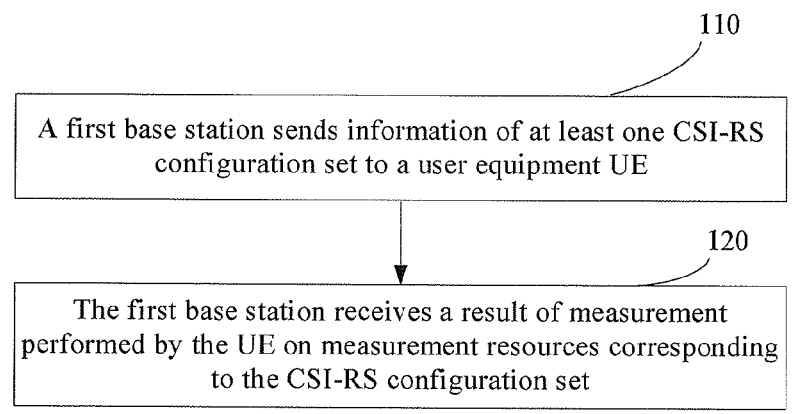
FIG. 1 is a flowchart of a measurement method based on CSI-RS resources according to an embodiment of the present invention.

FIG. 1 is a flowchart of a measurement method based on CSI-RS resources according to an embodiment of the present invention. Specifically, the measurement method includes the following steps:

Step 110: A first base station sends information of at least one CSI-RS configuration set to a user equipment UE, where the CSI-RS configuration set includes at least two CSI-RS configurations.

If multiple access points APs, for example, two APs, are within coverage of the first base station, the sending, by a first base station, information of at least one CSI-RS configuration set to a user equipment UE may specifically include: sending, by the first base station, to the user equipment UE, information of a first CSI-RS configuration set allocated to a first access point and information of a second CSI-RS configuration set allocated to a second access point. Here, at least one of the first CSI-RS configuration set and the second CSI-RS configuration set includes at least two CSI-RS configurations. In the first CSI-RS configuration set and the second CSI-RS configuration set, all CSI-RS configurations differ from one another. For example, the first CSI-RS configuration set may include CSI-RS configurations A and B, the second CSI-RS configuration set may include CSI-RS configuration C, and the CSI-RS configurations A, B, and C differ from one another. It should be noted that, in the embodiment of the present invention, the number of access points APs is not limited to 2, but may be 1, or 3, or more. Importantly, at least one CSI-RS configuration set includes at least two CSI-RS configurations. In this embodiment, the information of CSI-RS configuration sets may include a CSI-RS configuration set information list, where the CSI-RS configuration set information list indicates a correlation between CSI-RS configurations and corresponding CSI-RS configuration sets; or, the information of CSI-RS configuration sets may include a CSI-RS configuration information list and CSI-RS configuration indexes of corresponding configuration sets, where a combination of the CSI-RS configuration information list and the CSI-RS configuration indexes of corresponding configuration sets indicates a correlation between CSI-RS configurations and corresponding CSI-RS configuration sets. Details about the CSI-RS configuration set information list, and details about the CSI-RS configuration information list and CSI-RS configuration indexes of corresponding configuration sets, will be described below with reference to other embodiments.

Step 120: The first base station receives a result of measurement performed by the UE on a subset or a full set of measurement resources corresponding to the CSI-RS configuration set. Because each configuration set includes at least two CSI-RS configurations, the UE may perform measurement on part or all of REs of the CSI-RS configurations and average the measurement data, thereby overcoming the defect that REs of a single CSI-RS are sparse. For example, if two APs are within coverage of a first base station, after receiving the information about CSI-RS configuration sets sent by the first base station, the UE performs measurement on a subset or a full set of corresponding measurement resources. Because the CSI-RS configurations differ from one another, after knowing what specific CSI-RS configurations are included in the first CSI-RS configuration set and the second CSI-RS configuration set respectively, the UE may average CSI-RS measurement results pertaining to the same CSI-RS configuration set, thereby obtaining the corresponding measurement result. Correspondingly, the first base station receives the result of measurement performed by the UE on measurement resources corresponding to the first CSI-RS configuration set and the second CSI-RS configuration set.

A person skilled in the art knows that CSI-RS configuration is used to define the configuration of a channel state information reference signal, which includes: releasing or setting up a channel; CSI-RS antenna port information for channel setup; frequency domain resource configuration information; code domain resource configuration information; CSI-RS subframe configuration information (including subframe offset information and period information); and a ratio of the transmit power of the PDSCH assumed by the UE to the transmit power of the CSI-RS. Therefore, that the CSI-RS configurations differ from one another may be implemented by making the CSI-RS configurations have different CSI reference signal configuration index numbers, different frequency domain resource configurations, different code domain resource configurations, different antenna port numbers, and/or different subframe configurations, which will be specifically described in detail in the following embodiments.

The embodiment of the present invention does not specifically limit how the information of CSI-RS configuration sets is sent to the user equipment UE, which may be any manner that can achieve the objective. For example, the information may be sent to the user equipment through radio resource control (Radio Resource Control, RRC) dedicated signaling and/or a system broadcast message, or through signaling based on the Media Access Control (MAC, Medium/Media Access Control) protocol, that is, MAC signaling.

In addition, according to an implementation manner, if a UE within coverage of the first base station needs to measure a cell of an access point within coverage of a second base station, the first base station may receive information, sent by the second base station, of CSI-RS configuration sets of the access point within coverage of the second base station. That is, the second base station sends the information of CSI-RS configuration sets to the first base station actively. Alternatively, the first base station may send a configuration request message to the second base station, requesting the second base station to send the information of CSI-RS configuration sets of the access point within coverage of the second base station to the first base station. After receiving the information of CSI-RS configuration sets sent by the second base station, the first base station sends the information to the UE.

In the solution provided in the embodiment of the present invention, although the REs of each CSI-RS are sparse, because multiple CSI-RS configurations are used simultaneously, and measurement is performed on a subset or a full set of corresponding measurement resources, the problem that REs of a single CSI-RS are sparse is solved, and the measurement precision is improved.

The following illustrates the solution of the present invention in detail with reference to specific embodiments.

Figure 2:
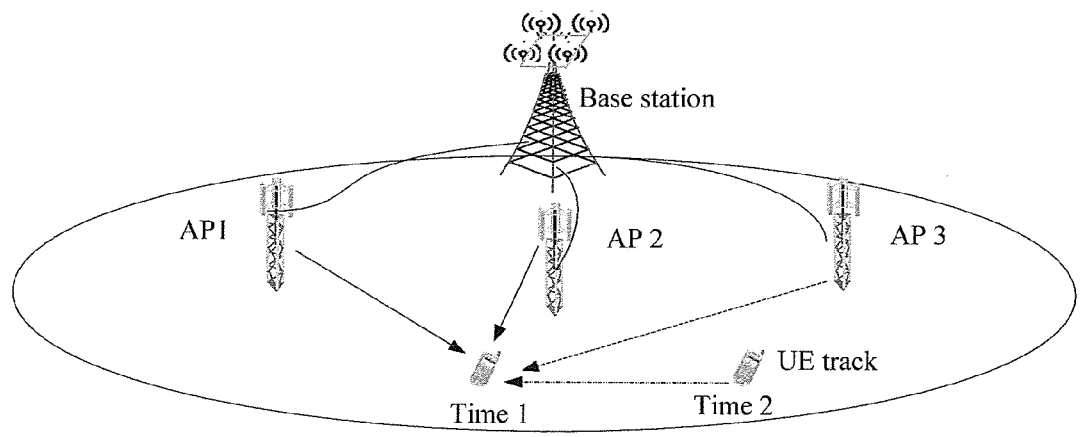
FIG. 2 is a schematic diagram of a communications system according to an embodiment of the present invention.

FIG. 2 is a schematic diagram of a communications system according to an embodiment of the present invention. In the communications system, 3 APs (AP1, AP2, and AP3) are connected to a central base station through fibers, and the physical cell identity of cell 0 of the base station is the same as the physical cell identity (Physical Cell Identity, PCI) of cell 0-1, cell 0-2, and cell 0-3 under AP1, AP2, and AP3, all being PCI 0. Port numbers configured for AP1 are 15, 16, 17, and 18; port numbers configured for AP2 are 15 and 16; and port numbers configured for AP3 are 15 and 16. A user equipment UE needs to measure the cells of the 3 APs separately.

Figure 3:
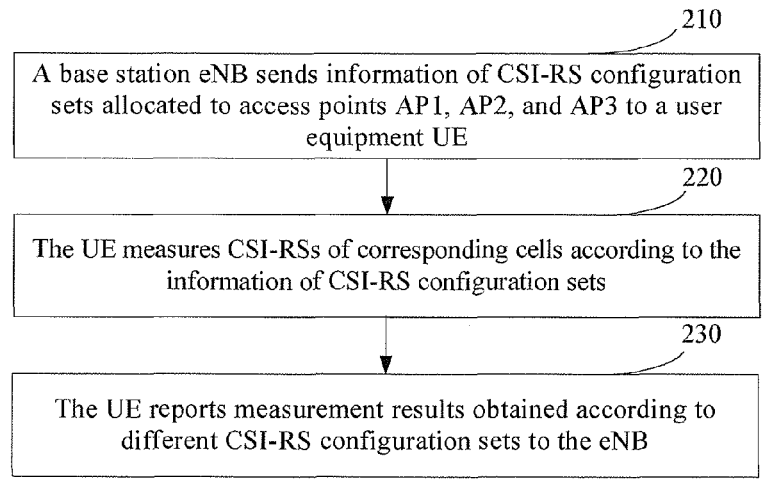
FIG. 3 is a flowchart of a measurement method according to the embodiment of the present invention.

FIG. 3 is a flowchart of a measurement method according to an embodiment of the present invention. It can be seen that, the measurement method according to the embodiment of the present invention includes:

Step 210: A base station sends information of CSI-RS configuration sets to a user equipment UE. The information of CSI-RS configuration sets, includes specific content of the configuration sets. For example, before step 210, the base station has made the following configuration:

For AP1, CSI-RS configuration set 1 (CSI-RS-Config 0 (an4); CSI-RS-Config 1 (an4); CSI-RS-Config 2 (an4)) is configured;

For AP2, CSI-RS configuration set 2 (CSI-RS-Config 3 (an2); CSI-RS-Config 7 (an2); CSI-RS-Config 5 (an2)) is configured; and For AP3, CSI-RS configuration set 3 (CSI-RS-Config 4 (an2); CSI-RS-Config 6 (an2); CSI-RS-Config 8 (an2)) is configured.

It can be seen that, for each AP, the CSI-RS configurations in each configuration set have configuration index numbers that differ from one another.

The base station may send information of at least one CSI-RS configuration set to the UE through RRC dedicated signaling and/or a system broadcast message, or in any other manners known by a person skilled in the art, without affecting the essence of the present invention.

Here, the information may include a CSI-RS configuration set information list, or include a CSI-RS configuration information list and CSI-RS configuration indexes of corresponding configuration sets.

For example, the base station may send the following CSI-RS configuration set information list to the UE:

CSI-RS configuration set 1 (CSI-RS-Config 0 (an4); CSI-RS-Config 1 (an4); CSI-RS-Config 2 (an4));

CSI-RS configuration set 2 (CSI-RS-Config 3 (an2); CSI-RS-Config 7 (an2); CSI-RS-Config 5 (an2)); and CSI-RS configuration set 3 (CSI-RS-Config 4 (an2); CSI-RS-Config 6 (an2); CSI-RS-Config 8 (an2)).

Therefore, the UE can obtain CSI-RS configurations corresponding to different configuration sets directly.

Alternatively, the base station may send the CSI-RS configuration information list and the CSI-RS configuration indexes of corresponding configuration sets to the UE, for example:

CSI-RS Configuration Information List:
0: CSI-RS-Config 0 (an4);
1: CSI-RS-Config 1 (an4);
2: CSI-RS-Config 2 (an4);
3: CSI-RS-Config 3 (an2);
4: CSI-RS-Config 7 (an2);
5: CSI-RS-Config 5 (an2);
6: CSI-RS-Config 4 (an2);
7: CSI-RS-Config 6 (an2);
8: CSI-RS-Config 8 (an2).
CSI-RS Configuration Indexes
CSI-RS configuration set 1 (0; 1; 2);
CSI-RS configuration set 2 (3; 4; 5);
CSI-RS configuration set 3 (6; 7; 8).

Therefore, the UE may determine the CSI-RS configurations corresponding to different configuration sets according to the received CSI-RS configuration information list and CSI-RS configuration indexes of corresponding configuration sets.

Optionally, the base station may also send the following information to the UE: measurement indication information corresponding to the configuration set of a measured CSI-RS, such as channel state information-reference signal received power (Channel State Information-Reference Signal Received Power, CSI-RSRP) measurement indication information and/or channel state information-reference signal received quality (Channel State Information-Reference Signal Received Quality, CSI-RSRQ) measurement indication information, to instruct the UE what specific measurement should be performed; and/or measurement reporting mode indication information to instruct the UE to perform periodical measurement reporting or event-triggered measurement reporting of measured values corresponding to the configuration set of the measured CSI-RS. If the manner indicated by the measurement reporting mode indication information is event-triggered reporting, parameters, such as configuration hysteresis value, hysteresis time, maximum number of reported measured cells, and number of reports, and/or other auxiliary configuration parameters such as layer-3 smooth filtering, may also be sent to the UE. If the manner indicated by the measurement reporting mode indication information is periodical reporting, a measurement reporting period may also be sent to the UE. Definitely, all the above parameters may also be preset in the UE by default, which is not limited herein.

Step 220: The UE measures corresponding CSI-RSs according to the information of CSI-RS configuration sets.

After receiving the configuration information sent by the base station, the UE may perform measurement on REs of multiple CSI-RSs of the CSI-RS configuration sets, distinguish between measurement resource groups according to one or more CSI-RS configurations corresponding to different CSI-RS configuration sets, and measure the CSI-RSs in the measurement resource groups separately to obtain signal quality of signals, and therefore may calculate the measured value corresponding to each resource group. In particular, the measurement result is a measured value of radio resource management (Radio Resource Management, RRM), such as a value of CSI-RSRP and/or CSI-RSRQ (which respectively represent channel state information-reference signal received power and channel state information-reference signal received quality). For example, the UE may measure the CSI-RSs in CSI-RS configuration set 1 to obtain measurement result 1, measure the CSI-RSs in CSI-RS configuration set 2 to obtain measurement result 2, and measure the CSI-RSs in CSI-RS configuration set 3 to obtain measurement result 3. Measurement result 1 is a result of averaging the data obtained with respect to CSI-RS-Config 0, CSI-RS-Config 1, and CSI-RS-Config 2 in configuration set 1; correspondingly, measurement result 2 and measurement result 3 are results of averaging the data obtained with respect to the configurations in configuration set 2 and configuration set 3 respectively. For example, the UE obtains the CSI-RSRP value by linearly averaging power obtained from REs that carry a CSI reference signal, where the CSI reference signal carried in the REs comes from the same CSI-RS configuration set. Optionally, the UE performs the operation within the range of measurement bandwidth. For another example, the CSI-RSRQ value is obtained according to N×CSI-RSRP/(RSSI of E-UTRA carrier), where N is the measurement bandwidth of the RSSI of an E-UTRA carrier, or according to N×CSI-RSRP/(RSSI measured on all REs that carry a CSI-RS), where N is the number of REs that carry the CSI-RS.

Because each configuration set allocated to an AP includes multiple CSI-RS configurations, the problem that the REs of a single CSI-RS are sparse is overcome, and higher measurement precision can be achieved.

Step 230: The UE reports measurement results obtained according to different CSI-RS configuration sets to the base station. Therefore, the UE may perform the periodical reporting or event-triggered reporting according to configuration of the network side. For example, after the base station sends measurement reporting mode indication information to the UE, the UE performs reporting according to the indication information. Correspondingly, the base station receives the measurement results reported by the UE.

After receiving the measurement results reported by the UE, the network side may perform subsequent operations according to the measurement results, for example, may perform UE handover, COMP measurement set maintenance, or UE uplink power control, or the like. As seen from this embodiment, in the solution in the embodiment of the present invention, at least two CSI-RS configurations are allocated to each CSI-RS configuration set correspondingly, and the CSI-RS configurations in the CSI-RS configuration sets differ from one another. Therefore, the UE can easily know which measurement results are correlated with which CSI-RS configuration set. In addition, because each CSI-RS configuration set includes multiple CSI-RS configurations, multiple measurement results can be obtained correspondingly, which improves the measurement precision.

In the foregoing embodiment, the CSI-RS configurations in all configuration sets have different CSI-RS reference signal configuration index numbers. According to an implementation manner, the CSI-RS configurations may also have different antenna port numbers to make the CSI-RS configurations differ from one another. For example, in the scenario illustrated in FIG. 2, port numbers configured for AP1 are 15, 16, 17, and 18; port numbers configured for AP2 are 15 and 16; and port numbers configured for AP3 are 17 and 18. Therefore, the base station may send the following configuration set information list to the UE:

CSI-RS Configuration Set Information List:

CSI-RS configuration set 1 (CSI-RS-Config 0 (an4); CSI-RS-Config 1 (an4); CSI-RS-Config 2 (an4));

CSI-RS configuration set 2 (CSI-RS-Config 3 (an4: port 15, 16); CSI-RS-Config 7 (an4: port 15, 16); CSI-RS-Config 5 (an4: port 15, 16));

CSI-RS configuration set 3 (CSI-RS-Config 3 (an4: port 17, 18); CSI-RS-Config 7 (an4: port 17, 18); CSI-RS-Config 5 (an4: port 17, 18)).

In this way, the UE can determine, according to different port numbers in the configuration sets, which AP is correlated with a corresponding measurement result. Also, because each CSI-RS configuration set includes at least two CSI-RS configurations, the problem that the REs of a single CSI-RS are sparse is overcome, and higher measurement precision can be achieved.

According to an implementation manner, the CSI-RS configurations may also have different subframe configurations to make the CSI-RS configurations differ from one another. For example, in the scenario illustrated in FIG. 2, port numbers configured for AP1 are 15, 16, 17, and 18; port numbers configured for AP2 are 15 and 16; and port numbers configured for AP3 are 15 and 16. The base station may send the following configuration set information to the UE:

CSI-RS Configuration Set Information List:

CSI-RS configuration set 1 (CSI-RS-Config 0 (an4): subframe configuration 1; CSI-RS-Config 0 (an4): subframe configuration 2; CSI-RS-Config 0 (an4): subframe configuration 3);

CSI-RS configuration set 2 (CSI-RS-Config 3 (an2): subframe configuration 1; CSI-RS-Config 3 (an2): subframe configuration 2; CSI-RS-Config 3 (an2): subframe configuration 3); and CSI-RS configuration set 3 (CSI-RS-Config 4 (an2): subframe configuration 1; CSI-RS-Config 4 (an2): subframe configuration 2; CSI-RS-Config 3 (an2): subframe configuration 4).

In this way, the UE can determine, according to different subframe configurations in the configuration sets with reference to different CSI reference signal configuration index numbers, which AP is correlated with a corresponding measurement result. Also, because each CSI-RS configuration set includes at least two CSI-RS configurations, the problem that the REs of a single CSI-RS are sparse is overcome, and higher measurement precision can be achieved.

In addition, the difference from one another may be implemented by changing the frequency domain resource configuration and code domain resource configuration in the CSI-RS configurations, which can be obtained by a person skilled in the art according to the teachings in the embodiment of the present invention.

Figure 4:
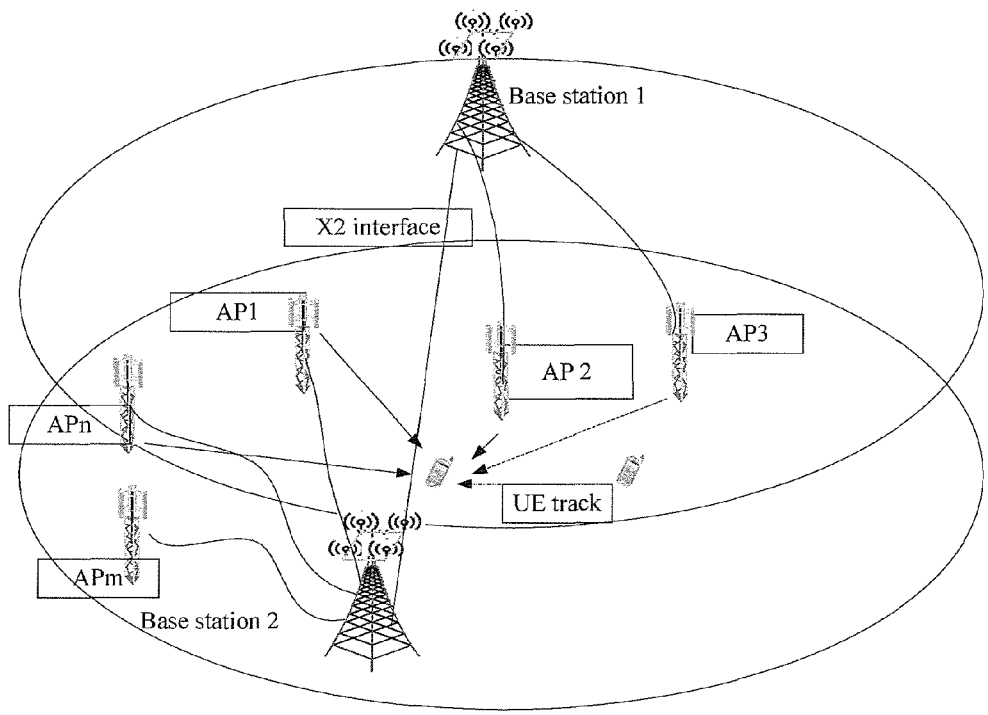
FIG. 4 is a schematic diagram of a communications system according to another embodiment of the present invention.

FIG. 4 is a schematic diagram of a communications system according to another embodiment of the present invention. In the communications system, AP2 and AP3 are connected to central base station 1 through fibers, and the physical cell identity of cell 0 of the base station is the same as the physical cell identity of cell 0-2 and cell 0-3 covered by AP2 and AP3, all being PCI 0; AP1 and APn are connected to central base station 2 through fibers, and the physical cell identity of cell 1 of the base station is the same as the physical cell identity of cell 0-1 and cell 0-n covered by AP1 and APn, all being PCI 2; and base station 1 is a base station of a serving cell of a UE.

Figure 5:
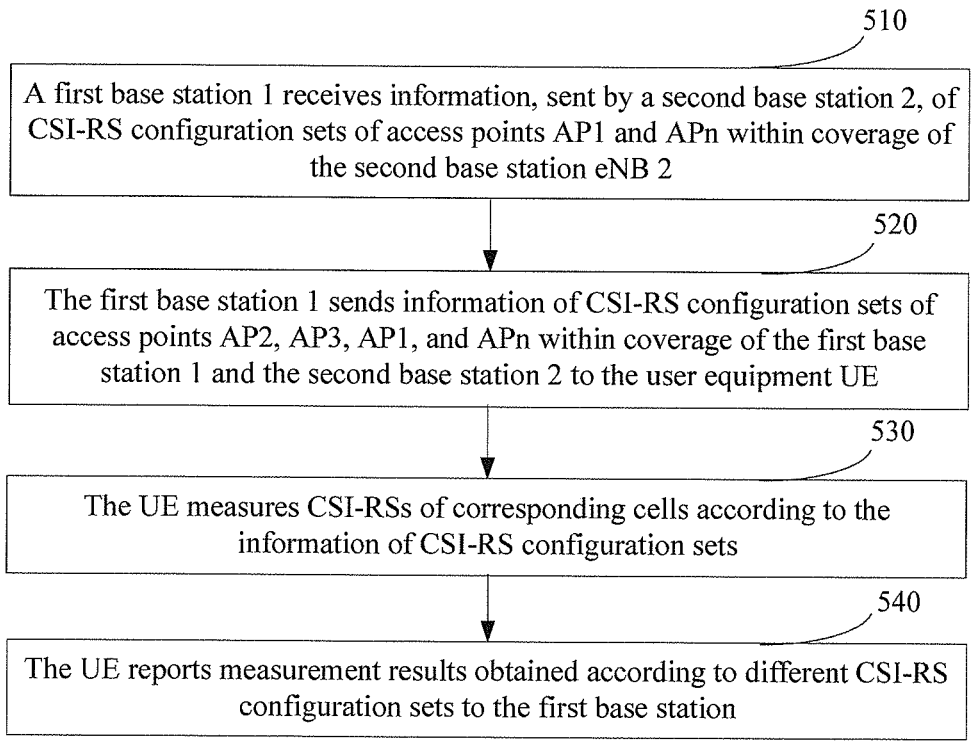
FIG. 5 is a flowchart of a measurement method according to an embodiment of the present invention.

FIG. 5 is a flowchart of a measurement method according to an embodiment of the present invention. It can be seen that, the measurement method in the embodiment of the present invention includes the following steps:

Step 510: A first base station 1 receives information, sent by a second base station 2, of CSI-RS configuration sets of access points AP1 and APn within coverage of the second base station 2.

To enable the UE to perform measurement under cells cell 0-1 and cell 0-n of the access points AP1 and APn within coverage of the second base station 2, the second base station 2 sends information of the CSI-RS configuration sets of the access points AP1 and APn to the first base station 1. Therefore, base station 2 may perform the sending when a certain condition is met. For example, in the case of periodical sending, the sending is performed when a sending period is reached, or the sending may be triggered by certain events, for example, change of a CSI-RS configuration, and/or change of AP deployment, and/or addition or deletion of an X2 interface.

As described in the foregoing embodiment, the CSI-RS configuration set information sent by base station 2 may be a CSI-RS configuration set information list, or a CSI-RS configuration information list and CSI-RS configuration indexes of corresponding configuration sets. Moreover, a configuration set includes at least two CSI-RS configurations, and the CSI-RS configurations have different CSI reference signal configuration index numbers, different frequency domain resource configurations, different code domain resource configurations, different antenna port numbers, and/or different subframe configurations, so as to make the configurations differ from one another.

For example, base station 2 may send the following information to base station 1:

CSI-RS Configuration Set Information List of Neighboring Cell PCI 2:

CSI-RS configuration set 3 (CSI-RS-Config 3 (an4: port 15, 16); CSI-RS-Config 7 (an4: port 15, 16); CSI-RS-Config 5 (an4: port 15, 16)); and CSI-RS configuration set 4 (CSI-RS-Config 3 (an4: port 17, 18); CSI-RS-Config 7 (an4: port 17, 18); CSI-RS-Config 5 (an4: port 17, 18)).

In addition, the information of CSI-RS configuration sets further includes mark numbers and/or identifiers of corresponding APs. Optionally, base station 2 may further send an identifier of the UE to base station 1.

Base station 2 may send the information to base station 1 over a private interface such as an X2 interface (that is, an interface between base stations in an LTE system), an S1 interface (that is, a connection interface between a core network and a base station), or a fiber interface, or send the information to base station 1 over an air interface (Over The Air, OTA). The interface is not limited herein.

It should be pointed out that, in this step, base station 2 may use a new independent message to send the information to base station 1, or send the message by using an X2 interface message or an S1 interface message in the prior art, for example, "X2 Setup Response", "Base Station Configuration Update Response", "Handover Request Response", "Load Information", and so on, which does not affect the essence of the present invention.

Step 520: The first base station 1 sends information of CSI-RS configuration sets of access points AP2, AP3, AP1, and APn within coverage of the first base station 1 and the second base station 2 to the user equipment UE.

For example, base station 2 may send the following information to base station 1:

CSI-RS Configuration Set Information List of Neighboring Cell PCI 1:

CSI-RS configuration set 1 (CSI-RS-Config 0 (an4); CSI-RS-Config 1 (an4); CSI-RS-Config 2 (an4)); and CSI-RS configuration set 2 (CSI-RS-Config 4 (an2); CSI-RS-Config 6 (an2); CSI-RS-Config 8 (an2)).

CSI-RS Configuration Set Information List of Neighboring Cell PCI 2:

CSI-RS configuration set 3 (CSI-RS-Config 3 (an4: port 15, 16); CSI-RS-Config 7 (an4: port 15, 16); CSI-RS-Config 5 (an4: port 15, 16)); and CSI-RS configuration set 4 (CSI-RS-Config 3 (an4: port 17, 18); CSI-RS-Config 7 (an4: port 17, 18); CSI-RS-Config 5 (an4: port 17, 18)).

It may be understood that, the CSI-RS configuration set information of PCI 1 and PCI 2 is only exemplary. As described in the foregoing embodiment, a person skilled in the art may distinguish between the configuration sets by using CSI-RS configurations that have different CSI reference signal configuration index numbers, different frequency domain resource configurations, different code domain resource configurations, different antenna port numbers, and/or different subframe configurations. For specific content, reference may be made to the foregoing embodiment and no detailed description is given here any further.

Step 530: The UE measures the CSI-RSs of corresponding measurement resources according to the information of CSI-RS configuration sets. For step 530, reference may be made to the description about step 220 with reference to FIG. 3. No repeated description is given here any further.

Step 540: The UE reports measurement results obtained according to different CSI-RS configuration sets to the first base station 1.

For example, in a scenario, an RRM COMP measurement set configured by serving base station 1 for the UE includes AP1, APn, AP2, and AP3. At time point 1, according to the measurement results reported by the UE, the CoMP measurement set allocated by base station 1 to the UE includes AP2, AP3, and AP1, that is, the UE needs to report measurement results including CSI of cells under AP2, AP3, and AP1, such as CSI 2, CSI 3, and CSI 1, to base station 1. From time point 1 to time point 2 when the UE moves, the measured value of the cell corresponding to AP3, which is measured by the UE, meets a condition for the cell to leave the COMP measurement set, but the measured value of the cell corresponding to APn, which is obtained by the UE, meets a condition for the cell to enter the COMP measurement set, the UE may report the following in an event-triggered manner:

CSI-RS Configuration Set Number n:
CSI-RSRPn and/or CSI-RSRQn and/or information about entering the COMP measurement set;
CSI-RS Configuration Set Number 3:
CSI-RSRP3 and/or CSI-RSRQ3 and/or information about leaving the COMP measurement set.

In another scenario, in an event-triggered manner, the UE may report a combination of at least one of the following: measurement index number corresponding to a measurement event, PCI, configured CSI-RS configuration set number, CSI-RSRP value, and CSI-RSRQ value.

Alternatively, the UE may periodically report a combination of at least one of the following: PCI, configured CSI-RS configuration set number, CSI-RSRP value, CSI-RSRQ value, and measurement event.

For example, at time point 1, the serving base station of the UE is base station 1; and base station 1 configures for the UE information of the CSI-RS measurement configuration sets of AP2 and AP3 of base station 1 and information of the CSI-RS measurement configuration sets of AP1 and APn of the second base station simultaneously. From time point 1 to time point 2 when the UE moves, base station 1 discovers that the signal quality of AP1 and APn under base station 2 meets a handover condition according to the measurement results reported by the UE. When base station 1 sends a handover request message to target base station 2, the message carries information of a target PCI and target APs, for example, in this embodiment, carries information of AP1 and APn, and optionally, may carry measured values. The target base station makes a handover admission decision according to the information of the target PCI and target APs in the handover request message sent by the serving base station, so that the UE completes a process of handover from a source base station to a determined AP of the target base station, for example, handover of the UE from base station 1 to base station 2, where base station 2 serves the UE at AP1 and/or APn.

Alternatively, at time point 1, the serving base station of the UE is base station 1; and base station 1 configures for the UE information of the CSI-RS measurement configuration sets of AP2 and AP3 of base station 1 and information of the CSI-RS measurement configuration sets of AP1 and APn of the second base station simultaneously. From time point 1 to time point 2 when the UE moves, base station 1 discovers that the signal quality of AP1 and APn under base station 2 meets a handover condition according to the measurement results reported by the UE. When base station 1 sends a handover request message to target base station 2, the message carries information of a target PCI and target APs in the COMP set, for example, in this embodiment, carries information of AP1 and APn, and optionally, carries measured values. The target base station makes a handover admission decision according to the information of the target PCI and target APs in the handover request message sent by the serving base station, so that the UE completes a process of handover from a source base station to a determined AP of the target base station, for example, handover of the UE from base station 1 to base station 2, where base station 2 uses AP1 and APn as a CoMP set of the UE.

After receiving the measurement results reported by the UE, the network side may perform subsequent operations according to the measurement results, for example, may perform UE handover, COMP measurement set maintenance, or UE uplink power control, or the like.

In the embodiment of the present invention, the second base station sends configuration information of the cell covered by an AP within its local coverage to another base stations in the network, so that all base stations in the network can learn configuration information of cells within coverage of the another base station and deliver the configuration information of cells within coverage of the another base station to the UE so that the UE can perform measurement or other operations for the cells under the another base station.

It should be noted that although only one second base station 2 is given in the embodiment of the present invention, the solution of the present invention is not limited thereto. In a case where multiple second base stations exist, a person skilled in the art can easily know that it only needs to enable other base stations to send corresponding configuration information to the first base station, which shall fall within the protection scope of the embodiments of the present invention.

In addition, in this embodiment, the second base station 2 sends the information of CSI-RS configuration sets to the first base station 1 actively. Alternatively, the first base station 1 first sends a configuration request message, requesting the second base station 2 to send information of the CSI-RS configuration sets of access points within coverage of the second base station to the first base station, and then base station 2 sends the information of the CSI-RS configuration sets to the first base station 1 in response to the configuration request message, which shall fall within the protection scope of the embodiments of the present invention. Similarly, the configuration request message may be a new independent message, or an X2 interface message or an S1 interface message in the prior art, such as "X2 Setup Request", "Base Station Configuration Update", "Handover Request", or "Load Information", may be used to send the information, which does not affect the essence of the present invention.

In addition, it should be noted that the base station may allocate multiple CSI-RS configuration sets to an AP simultaneously. For example, the base station 1 may allocate two different CSI-RS configuration sets to AP1 simultaneously, and all measurement results on measurement resources corresponding to these CSI-RS configuration sets are correlated with AP1, which shall also fall within the protection scope of the embodiments of the present invention.

In addition, although a corresponding CSI-RS configuration set is allocated to each access point AP in the foregoing embodiment, the present invention is not limited thereto. For example, alternatively, no CSI-RS configuration set is allocated to certain APs, but a common reference signal (Common Reference Signal, CRS) configuration is allocated instead, and the measurement with respect to these APs is still based on CRS measurement resources. The UE may consider both the measured values obtained based on CRS measurement resources and the measured values obtained based on CSI-RS measurement resources in performing measurement result related operations, such as comparison and/or sorting of measurement values, and/or measurement event judgment. Such a manner is also covered in the protection scope of the embodiments of the present invention.

Figure 6:
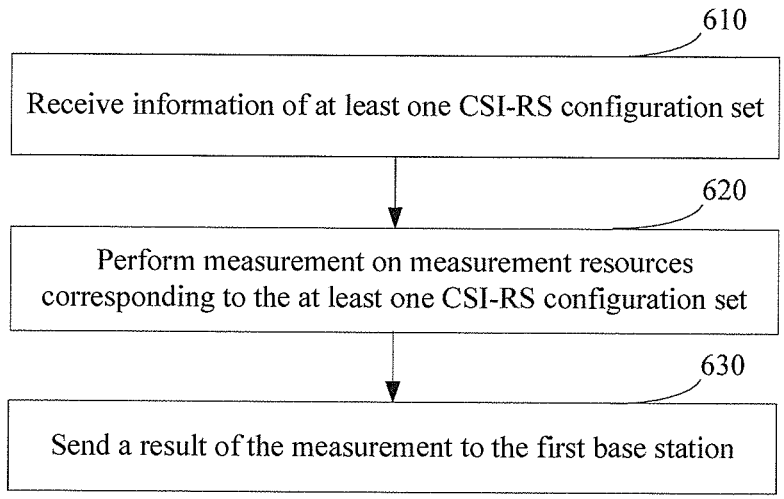
FIG. 6 is a flowchart of a measurement method based on CSI-RS resources according to an embodiment of the present invention.

FIG. 6 is a flowchart of a measurement method based on CSI-RS resources according to an embodiment of the present invention. It can be seen that, the measurement method includes the following:

Step 610: Receive information of at least one CSI-RS configuration set.

Step 620: Perform measurement on measurement resources corresponding to the at least one CSI-RS configuration set.

Step 630: Send a result of the measurement to a first base station.

The CSI-RS configuration set includes at least two CSI-RS configurations.

For specific content of this embodiment, reference may be made to the corresponding part of the foregoing description with respect to a base station, and no repeated description is given here any further.

Figure 7:
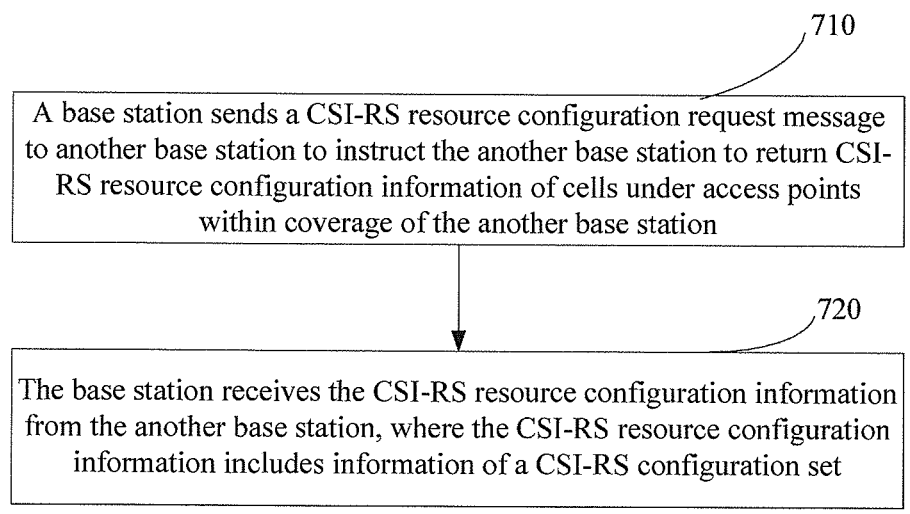
FIG. 7 is a flowchart of a CSI-RS resource sharing method according to an embodiment of the present invention.

In addition, an embodiment of the present invention further provides a method for inter-cell CSI-RS resource sharing. FIG. 7 is a flowchart of a CSI-RS resource sharing method according to an embodiment of the present invention. It can be seen that, the method includes the following:

Step 710: A base station sends a CSI-RS resource configuration request message to another base station to instruct the other base station to return CSI-RS resource configuration information of cells under access points within coverage of the another base station.

Step 720: The base station receives the CSI-RS resource configuration information from the other base station, where the CSI-RS resource configuration information includes information of a CSI-RS configuration set, where the CSI-RS configuration set includes at least two CSI-RS configurations.

By using the method, the base station can learn the CSI-RS resource configuration information of other base stations.

According to an implementation manner, the base station may also send CSI-RS resource configuration information of cells under access points within its local coverage to the other base station in a network. In this way, the other base station in the network can also learn the CSI-RS resource configuration information of the base station, thereby implementing CSI-RS resource sharing.

The CSI-RS resource configuration request message and/or the CSI-RS resource configuration information may be sent and/or received over an X2 interface or an S1 interface in the prior art. For specific content here, reference may be made to the corresponding part of the foregoing embodiment, and no repeated description is given here any further.

Figure 8:
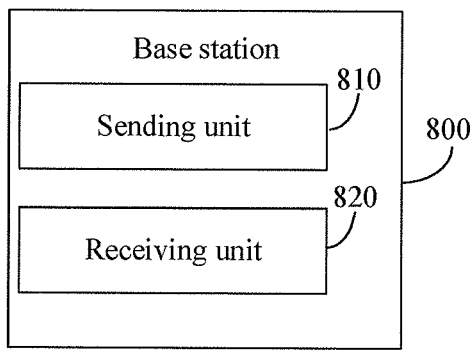
FIG. 8 is a schematic structural diagram of a base station according to an embodiment of the present invention.

Correspondingly, an embodiment of the present invention provides a base station. FIG. 8 is a schematic structural diagram of a base station according to an embodiment of the present invention. The base station 800 includes: a sending unit 810, configured to send information of at least one CSI-RS configuration set to a user equipment UE; and a receiving unit 820, configured to receive a result of measurement performed by the UE on a subset or a full set of measurement resources corresponding to the CSI-RS configuration set, where the CSI-RS configuration set includes at least two CSI-RS configurations.

According to an implementation manner, the receiving unit is further configured to receive information, sent by a second base station, of CSI-RS configuration sets of access points within coverage of the second base station.

According to an implementation manner, the sending unit is further configured to send a configuration request message to the second base station, requesting the second base station to send information of CSI-RS configuration sets of access points within coverage of the second base station to the first base station.

Figure 9:
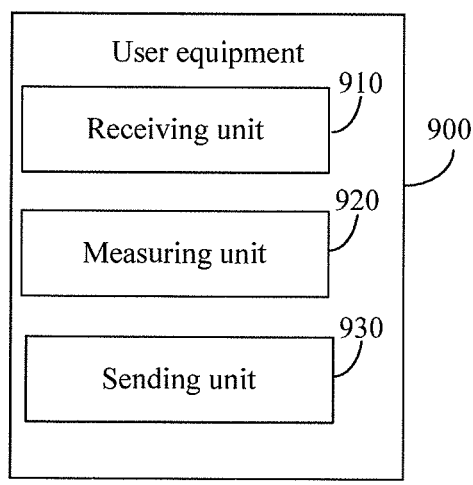
FIG. 9 is a schematic structural diagram of a user equipment according to an embodiment of the present invention.

Correspondingly, an embodiment of the present invention provides a user equipment UE. FIG. 9 is a schematic structural diagram of a user equipment according to an embodiment of the present invention. The user equipment 900 includes: a receiving unit 910, configured to receive information of at least one CSI-RS configuration set; a measuring unit 920, configured to perform measurement on a subset or a full set of measurement resources corresponding to the at least one CSI-RS configuration set; and a sending unit 930, configured to send a result of the measurement to a first base station, where the CSI-RS configuration set includes at least two CSI-RS configurations.

According to an implementation manner, the sending unit sends the measurement result to the first base station periodically or in an event-triggered manner.

Figure 10:
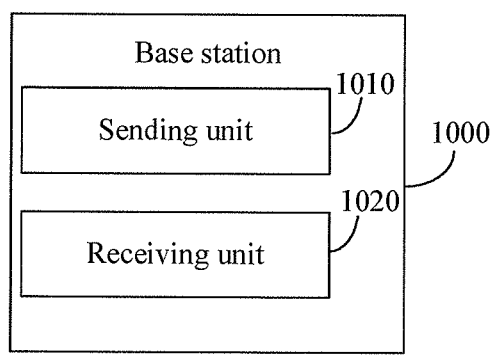
FIG. 10 is a schematic structural diagram of a base station according to an embodiment of the present invention.

Correspondingly, an embodiment of the present invention provides a base station. FIG. 10 is a schematic structural diagram of a base station according to an embodiment of the present invention. The base station 1000 includes: a sending unit 1010, configured to send a CSI-RS resource configuration request message to another base station to instruct the another base station to return CSI-RS resource configuration information of cells under access points within coverage of the another base station; and a receiving unit 1020, configured to receive the CSI-RS resource configuration information from the another base station, where the CSI-RS resource configuration information includes information of a CSI-RS configuration set, where the CSI-RS configuration set includes at least two CSI-RS configurations.

According to an implementation manner, the sending unit is further configured to send CSI-RS resource configuration information of cells under access points within local coverage to the other base station in a network.

According to an implementation manner, the sending unit sends the configuration request message to another base station in the network over an X2 interface or an S1 interface; and/or the receiving unit receives the CSI-RS resource configuration information from the another base station over an X2 interface or an S1 interface; and/or the sending unit sends the CSI-RS resource configuration information of cells under access points within local coverage to the another base station in the network over an X2 interface or an S1 interface.

For other details of the apparatus embodiments, reference may be made to the corresponding parts of the foregoing method embodiments, and no repeated description is given here any further.

A person skilled in the art should understand that the modules of the apparatus in the embodiments of the present invention are divided by functions and that in practice, and the function modules may be separated or combined for the specific structure.

The sequence numbers of the foregoing embodiments of the present invention are merely for description but do not indicate the preference of the embodiments.

The technical solutions disclosed in the claims also fall within the protection scope of the embodiments of the present invention A person of ordinary skill in the art may understand that all or part of the steps of the methods in the foregoing embodiments may be implemented by a program instructing relevant hardware. The program may be stored in a computer readable storage medium.

The foregoing descriptions are merely exemplary embodiments of the present invention, but are not intended to limit the protection scope of the present invention. Any modifications, equivalent replacements, and improvements made within the spirit and principles of the present invention shall fall within the protection scope of the present invention.

What is claimed is:

1. A measurement method based on channel state information-reference signal (CSI-RS) resources, the method comprising:
   sending, by a first base station, information of at least one CSI-RS configuration set to a user equipment (UE); and
   receiving, by the first base station, a result of measurement performed by the UE on a subset or a full set of measurement resources corresponding to the CSI-RS configuration set;
   wherein the CSI-RS configuration set comprises at least two CSI-RS configurations;
   wherein the information of the at least one CSI-RS configuration set comprises a CSI-RS configuration set information list, wherein the CSI-RS configuration set information list comprises at least two CSI-RS configuration sets, each CSI-RS configuration set correlated with at least two CSI-RS configurations.

2. The measurement method according to claim 1, wherein the information of the at least one CSI-RS configuration set comprises a CSI-RS configuration information list and CSI-RS configuration indexes of corresponding configuration sets, wherein a combination of the CSI-RS configuration information list and the CSI-RS configuration indexes of corresponding configuration sets indicates a correlation between CSI-RS configurations and corresponding CSI-RS configuration sets.

3. The measurement method according to claim 1, wherein CSI-RS configurations in different CSI-RS configuration sets and within one configuration set have different CSI reference signal configuration index numbers, different frequency domain resource configurations, different code domain resource configurations, different antenna port numbers, and/or different subframe configurations.

4. The measurement method according to claim 1, wherein sending the information of at least one CSI-RS configuration set to the UE comprises:
   sending the information to the UE by using radio resource control (RRC) dedicated signaling and/or a system broadcast message.

5. The measurement method according to claim 1, wherein before sending the information of at least one CSI-RS configuration set to the UE, the method further comprises:
   receiving, by the first base station, information, sent by a second base station, of CSI-RS configuration sets of access points within coverage of the second base station.

6. The measurement method according to claim 5, further comprising:
   sending, by the first base station, a configuration request message to the second base station, requesting the second base station to send information of CSI-RS configuration sets of access points within coverage of the second base station to the first base station.

7. The measurement method according to claim 1, further comprising:
   when the first base station sends a handover request message to a target second base station according to a measured value reported by the UE, carrying information of a target physical cell identity (PCI) and at least one target access point.

8. The measurement method according to claim 7, wherein when the first base station sends a handover request message to the target second base station according to a measured value reported by the UE, further carrying measured values corresponding to access points.

9. A measurement method based on channel state information-reference signal (CSI-RS) resources, the method comprising:
   receiving information of at least one CSI-RS configuration set;
   performing measurement on a subset or a full set of measurement resources corresponding to the at least one CSI-RS configuration set; and
   sending a result of the measurement to a first base station;
   wherein the CSI-RS configuration set comprises at least two CSI-RS configurations;
   wherein the information of the at least one CSI-RS configuration set comprises a CSI-RS configuration set information list, wherein the CSI-RS configuration set information list comprises at least two CSI-RS configuration sets, each CSI-RS configuration set correlated with at least two CSI-RS configurations.

10. The measurement method according to claim 9, wherein the information of the at least one CSI-RS configuration set comprises a CSI-RS configuration information list and CSI-RS configuration indexes of corresponding configuration sets, wherein a combination of the CSI-RS configuration information list and the CSI-RS configuration indexes of corresponding configuration sets indicates a correlation between CSI-RS configurations and corresponding CSI-RS configuration sets.

11. The measurement method according to claim 9, wherein CSI-RS configurations in different CSI-RS configuration sets and within one configuration set have different CSI reference signal configuration index numbers, different frequency-domain resource configurations, different code domain resource configurations, different antenna port numbers, and/or different subframe configurations.

12. The measurement method according to claim 9, wherein the result of the measurement is sent to the first base station periodically or in an event-triggered manner.

13. The measurement method according to claim 9, wherein the result of the measurement is a measured value of radio resource management (RRM), which comprises a value of channel state information-reference signal received power (CSI-RSRP) and/or channel state information-reference signal received quality (CSI-RSRQ), and/or a measurement event.

14. The measurement method according to claim 13, wherein the value of CSI-RSRP is obtained by linearly averaging power obtained from part or all of resource elements that carry a CSI reference signal that comes from the same CSI-RS configuration set.

15. The measurement method according to claim 13, wherein:
   the CSI-RSRQ value is obtained according to N×CSI-RSRP/(received signal strength indicator (RSSI) of an evolved universal mobile telecommunications service terrestrial radio access (E-UTRA) carrier), wherein N is the measurement bandwidth of the RSSI of an E-UTRA carrier; or the CSI-RSRQ value is obtained according to N×CSI-RSRP/(RSSI measured on all resource elements (REs) that carry a CSI-RS), wherein N is the number of REs that carry the CSI-RS.

16. A base station, comprising:
a transmitter, configured to send information of at least one channel state information-reference signal (CSI-RS) configuration set to a user equipment (UE); and
a receiver, configured to receive a result of measurement performed by the UE on a subset or a full set of measurement resources corresponding to the CSI-RS configuration set;
wherein the CSI-RS configuration set comprises at least two CSI-RS configurations;
wherein the information of the at least one CSI-RS configuration set comprises a CSI-RS configuration set infatuation list, wherein the CSI-RS configuration set information list comprises at least two CSI-RS configuration sets, each CSI-RS configuration set correlated with at least two CSI-RS configurations.

17. The base station according to claim 16, wherein the receiver is further configured to receive information, sent by a second base station, of CSI-RS configuration sets of access points within coverage of the second base station.

18. The base station according to claim 17, wherein the transmitter is further configured to send a configuration request message to the second base station, requesting the second base station to send information of CSI-RS configuration sets of access points within coverage of the second base station to a first base station.

* * * * *